No. 892,128. PATENTED JUNE 30, 1908.
H. J. BRIDGES.
MEAT CUTTER.
APPLICATION FILED MAY 14, 1906.

2 SHEETS—SHEET 1.

Witnesses
C. R. Thomas
F. B. MacNab

Inventor
H. J. Bridges
By Chandler & Chandler
Attorneys

No. 892,128. PATENTED JUNE 30, 1908.
H. J. BRIDGES.
MEAT CUTTER.
APPLICATION FILED MAY 14, 1906.
2 SHEETS—SHEET 2.
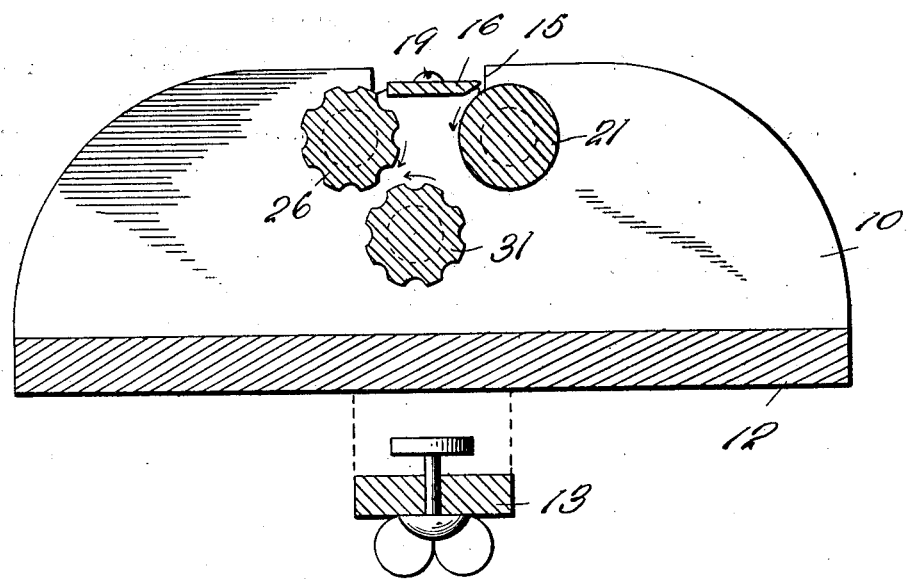
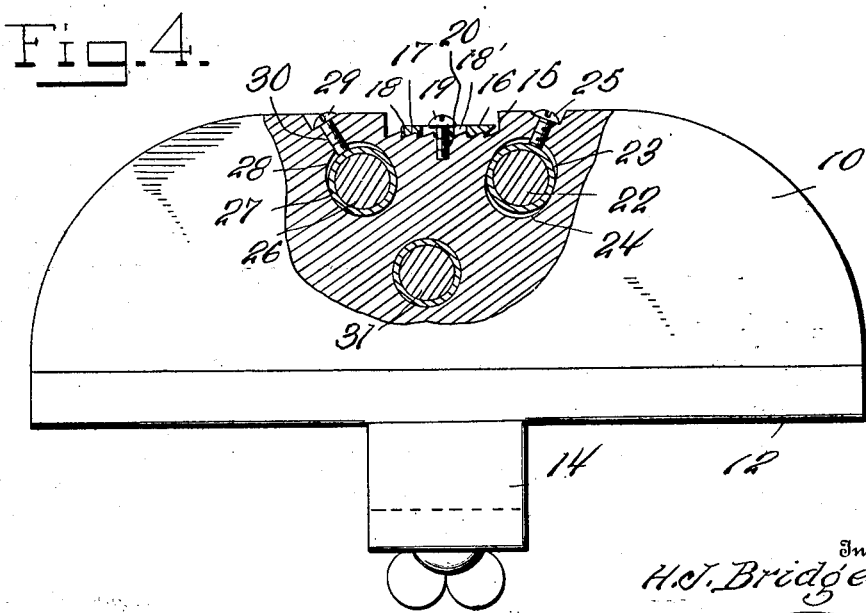
Witnesses
G. R. Thomas
F. B. MacNab
Inventor
H. J. Bridges
By Chandler & Chandler
Attorneys

UNITED STATES PATENT OFFICE.

HENRY J. BRIDGES, OF FARMINGTON, MISSOURI.

MEAT-CUTTER.

No. 892,128.   Specification of Letters Patent.   Patented June 30, 1908.

Application filed May 14, 1906. Serial No. 316,755.

*To all whom it may concern:*

Be it known that I, HENRY J. BRIDGES, a citizen of the United States, residing at Farmington, in the county of St. Francois, State of Missouri, have invented certain new and useful Improvements in Meat-Cutters; and I do hereby declare the following to be a full, clear, and exact description of the invention, such as will enable others skilled in the art to which it appertains to make and use the same.

This machine has relation to implements used by butchers when cutting up freshly killed pork, and stripping the tough outer skin from off the middlings or lard meat. This work has usually been done, especially by farmers and others doing butchering on a small scale, by hand, resulting often in cutting off a great amount of meat with the skin and thus occasioning waste, hard labor and the loss of a good deal of time.

This invention is designed to overcome difficulties losses, and other troubles, and effecting the stripping of nothing but the thin, hard rind from the middlings and other parts bearing lard almost entirely.

The invention will be described hereinafter in detail and then pointed out in the claims.

Figure 1:
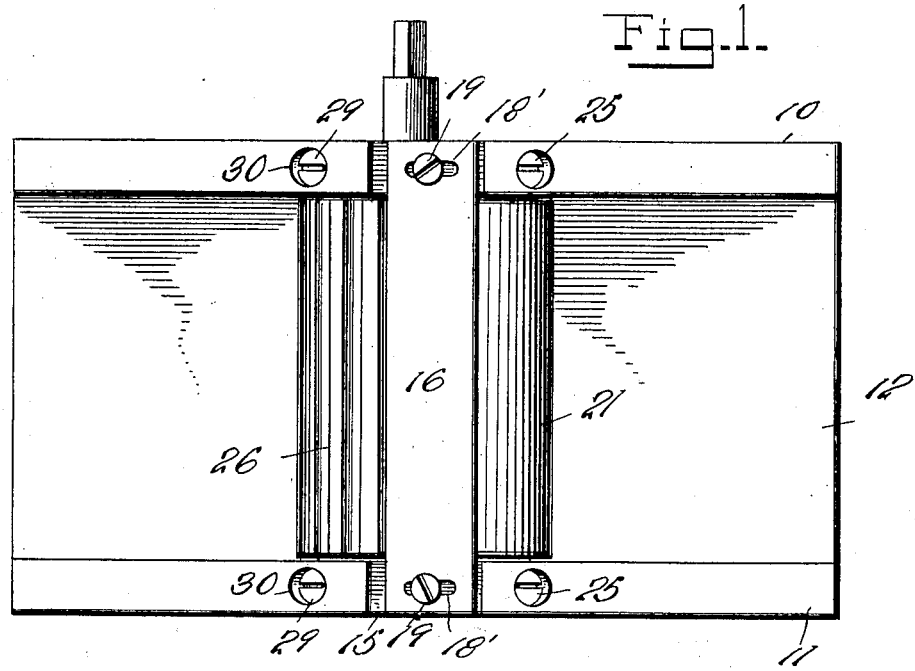
Figure 2:
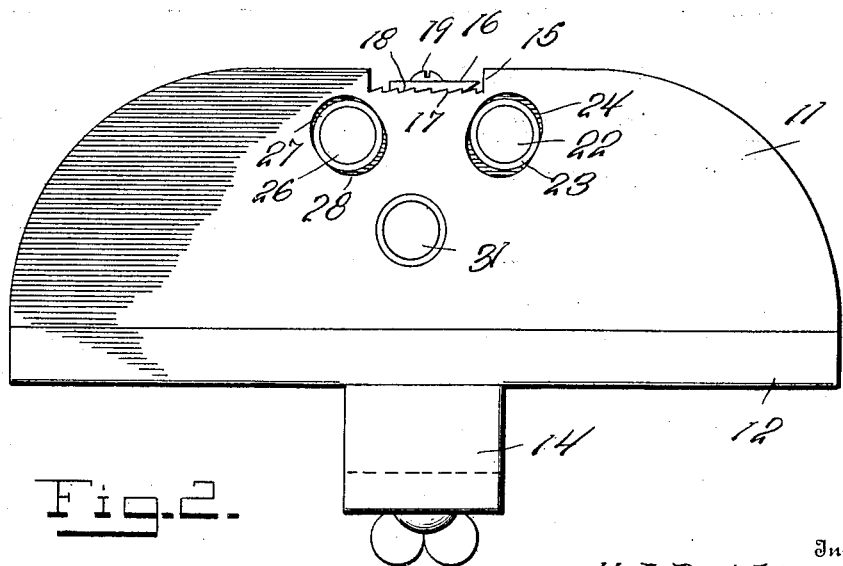

Reference is to be had to the annexed drawings and to the figures of reference marked thereon, forming a part of this specification, of which drawings Figure 1 is a plan. Fig. 2 is a side elevation. Fig. 3 is a central longitudinal section. Fig. 4 is a view similar to Fig. 2, partially in section.

The same figures of reference designate the same parts wherever they occur.

In the drawings, 10 designates a casting, forming one side of the machine, 11 is the casting forming the other side, 12 is a plate constituting the base, and 13 is a bar below the plate 12, forming a part of the means by which the machine may be clamped to the top of a table or other support, the said bar being spaced or set off from the base 12 by a part 14 at one end between it and the base.

The upper face of the sides 10 and 11 are countersunk or have notches 15 formed therein which form bearings for the ends of the knife 16 and faces of said bearings have slight grooves 17, but grooves of appreciable depth, formed therein, which grooves extend somewhat at an angle to the length of the knife 16, and the under side of the ends of the knife resting upon the said bearings 15 are likewise grooved or roughened as at 18, this being done to avoid all slippage of the knife on its bearings. The knife is a blade of good metal about one-eighth of an inch in thickness and one and one-half inches wide and beveled from the under side. This blade 16 has oblong holes 18' made in the ends to receive the shanks of the screws 19 that are passed therethrough and tapped into holes 20 formed centrally in the bearings 15. The holes 18' being elongated permits of the blade being adjusted backward and forward on its bearings.

21 designates a cast iron roller reduced at its ends to form bearings 22 which turn in bearings 23 arranged in holes 24 formed in the side castings, which said bearings 23 may have screws 25 turned in the side castings and resting on the bearings to adjust the latter to some extent with reference to the edge of the blade, when necessary.

26 designates a slightly grooved or corrugated roller, reduced at its ends to form journals which extend into box-bearings or bearings 27 of a type suited to the purpose which are arranged in slightly inwardly and downwardly inclined apertures 28 that are adjustable by screws 29 extending through inclined holes 30 formed in the side castings from the top to the said bearings. The longitudinal grooves formed in the face of the several rollers are deep enough to insure of their taking good hold on the material acted upon by them, but still they are so formed as to avoid cutting the rind or skin in pulling it through the machine.

A cast iron roller 31 like the roller 26 is arranged to turn in bearings formed in the side castings below the rollers 21 and 26 and intermediate of the same. One end of said roller 31 is elongated on one side where it extends through and beyond the side casting and is squared to receive a crank (not shown) by which the machine is operated. A thumb-screw turned through the bar 13 below the base-plate 12 may serve with the base-plate to clamp the machine to a table or bench. Screws 19 pass through the oblong holes in the ends of the blade or knife to adjust the latter to and from the roller 21 so as to secure the depth and kind of cut in the material acted upon, as the character of the latter may call for. Instead of providing regular journal boxes for the journals of the rollers, the said rollers may be journaled in leather bushings or thick bushings of similar material that may yield to the set screws acting thereon to adjust the rollers slightly, being all that will ordinarily be needed.

The operation of the crank, as before stated, particularly when there is material in the machine will turn the roller 31, and as the material passes between it and the roller 26, the latter will be turned by contact with the passing material, the said two rollers forming, as it were, the draft or feed rollers, while the roller 22 acts as a guide-roller to the knife 16.

In operation the machine will be clamped to a bench or table by the means described, and the meat being cut into strips not wider than the length of the knife may be assisted in its insertion between the front roller and cutting edge of the knife, with the meat or fat resting on the blade. By the continued turning of the crank the hard rind will pass through under the knife and between the rollers which will operate to pull it through until the operator can get hold of it to assist, when the meat and fat will quickly run out into a pan arranged to receive it and the rind will be thrown aside. Care will always be taken to adjust the knife properly with respect to the rollers, having in view the condition or character of the meat to be acted upon.

It will be understood that the roller 21 coöperates with the knife in cutting the rind or skin from the meat or fat, and that the pair of rollers 26 and 31 coact in engaging the rind and drawing it back, and in this way also assisting the feed of material to the knife. The bottom 12 serves as a means for holding the pans to catch the products of the machine as well as a support in front on which the middlings or strips of pork to be operated upon may be placed.

What is claimed, is:—

A machine for stripping the rind from middlings comprising two side-castings and a bottom plate and means for clamping the same to a table or bench, two corrugated draft rollers journaled in said side castings one of said draft-rollers having one of its journals extended and fitted to receive a crank to turn it, a knife supported on the upper edges of the side castings, and a guide-roller, also journaled in said side-castings in advance of the knife, the draft rollers being arranged in rear of the guide-roller and cutting edge of the knife.

In testimony whereof, I affix my signature, in presence of two witnesses.

HENRY J. BRIDGES.

Witnesses:
WM. L. SACKMANN,
M. A. YOUNG.